United States Patent
Rao et al.

(10) Patent No.: US 6,628,312 B1
(45) Date of Patent: Sep. 30, 2003

(54) INTERACTIVE INTERFACE FOR VISUALIZING AND MANIPULATING MULTI-DIMENSIONAL DATA

(75) Inventors: Ramana B. Rao, San Francisco, CA (US); Tichomir G. Tenev, San Jose, CA (US); Stuart K. Card, Los Altos Hills, CA (US)

(73) Assignee: InXight Software, Inc., Sunnyvale, CA (US)

( * ) Notice: Subject to any disclaimer, the term of this patent is extended or adjusted under 35 U.S.C. 154(b) by 0 days.

(21) Appl. No.: 09/203,480

(22) Filed: Dec. 2, 1998

Related U.S. Application Data

(60) Provisional application No. 60/067,242, filed on Dec. 2, 1997.

(51) Int. Cl.[7] .................................................. G06F 3/14
(52) U.S. Cl. ........................ 345/853; 345/764; 345/765; 345/855; 345/713
(58) Field of Search .............................. 345/853, 855, 345/781, 713, 764, 857, 968

(56) References Cited

U.S. PATENT DOCUMENTS

| | | | |
|---|---|---|---|
| 5,072,412 A | 12/1991 | Henderson, Jr. et al. | 395/159 |
| 5,226,118 A | 7/1993 | Baker et al. | 395/161 |
| 5,289,571 A | 2/1994 | Harada et al. | 395/148 |
| 5,379,372 A | 1/1995 | Wu | 395/148 |
| 5,420,695 A | 5/1995 | Ohta | 358/462 |
| 5,504,853 A * | 4/1996 | Schuur et al. | 345/853 |
| 5,546,529 A * | 8/1996 | Bowers et al. | 395/348 |
| 5,632,009 A | 5/1997 | Rao et al. | |
| 5,668,961 A | 9/1997 | Healy et al. | 345/339 |
| 5,670,984 A | 9/1997 | Robertson et al. | 345/139 |
| 5,745,891 A | 4/1998 | Minakuchi et al. | 707/3 |
| 5,758,152 A * | 5/1998 | LeTourneau | 707/102 |
| 5,832,475 A * | 11/1998 | Agrawal et al. | 707/2 |
| 5,883,635 A | 3/1999 | Rao et al. | 345/440 |
| 5,918,232 A * | 6/1999 | Pouschine et al. | 707/103 |
| 6,002,865 A * | 12/1999 | Thomsen | 395/600 |
| 6,085,202 A | 7/2000 | Rao et al. | 707/509 |

FOREIGN PATENT DOCUMENTS

| | | |
|---|---|---|
| EP | 0 447 095 A3 | 9/1991 |
| EP | 0 619 549 A1 | 4/1993 |
| EP | 0 644 500 A2 | 3/1995 |
| GB | 2 139 846 A | 11/1984 |
| WO | 91/04541 | 4/1991 |

OTHER PUBLICATIONS

OLAP On–line analytical Procressing with TM/1 EF Codd & Associates 1994.*

J. Goldstein et al., "Using Aggregation and Dynamic Queries for Exploring Large Data Sets," *Human Factors in Computer Systems*, Boston, MA USA, Apr. 24–28, 1994, pp. 23–29.

M. Spenke, et al., "Focus: The Interactive Table for Product Comparison and Selection," GMD—German National Research Center for Information Technology, pp. 41–50.

OLAP, On–Line Analytical Processing with TM/1, E.F. Codd & Associates, 1994.

(List continued on next page.)

*Primary Examiner*—Kristine Kincaid
*Assistant Examiner*—Thomas T. Nguyen
(74) *Attorney, Agent, or Firm*—Warren S. Wolfeld; Haynes Beffel & Wolfeld LLP

(57) ABSTRACT

A software visualization tool consistent with the present invention integrates OLAP functionality with focus+context based techniques for navigation through and inspection of large multidimensional datasets. Focus+context based navigation techniques are used to increase the clarity and information content provided to the user. The visualization tool supports a number of operations of the data set, including: select-slice, aggregation, promote/demote, repeat-variables, and sort.

27 Claims, 14 Drawing Sheets

OTHER PUBLICATIONS

Execu–View: Visualizing the Multidimensional Enterprise, A Practical Solution for Mangerial Investigation, Comshare, 1992.

Computers & Accounting, Essbase at Symantec, *Management Acctg.*, Jun. 1994.

Essbase in Action, Arbor Software, 1994.

F. Hayes, "Data Staging Suits Quantum," *Open Systems Today*, 1994.

R. Finkelstein, "MDD: Database Reaches the Next Dimension," *Database Programming & Design*, vol. 8, No. 4, Apr. 1995.

E. F. Codd et al., "Beyond Decision Support," *Computerworld*, Jul. 26, 1993, pp. 87–90.

R. C. Bolt, "Essbase to the Rescue," *DBMS*, vol. 8, No. 3, Mar. 1995.

Manojit Sarkar et al. *"Graphical Fisheye Views of Graphs"* Proceedings of the 1992 Conference on Human Factors in Computer Systems, May 1992 Monterey, California pp. 83–91.

J. Goldstein et al., *"Using Aggregation and Dynamic Queries for Exploring Large Data Sets"* Human Factors in Computer Systems, Boston, MA USA, Apr. 24–28, 1994, pp. 23–29.

OLAP, On–Line Analytical Processing with TM/1, E.F. Codd & Associates 1994.

Execu–View: Visualizing the Multidimensional Enterprise, A Practical Solution for Managerial Investigation Comshare 1992.

Computers & Accounting, Essbase at Symantec, Management Acctg., Jun. 1994.

Essbase in Action, Arbor Software 1994.

F. Hayes, *"Data Staging Suits Quantum"* Open Systems Today, 1994.

R. Finkelstein, *"MDD: Database Reaches the Next Dimension"* Database Programming & Design, vol. 8, No. 4, Apr. 1995.

E.F. Codd et al., *"Beyond Decision Support"* Computerworld, Jul. 26, 1993, pp. 87–90.

R.C. Bolt *"Essbase to the Rescue"* DBMS, vol. 8, No. 3, Mar. 1995.

Sarkar et al. *"Stretching the Rubber Sheet: A Metaphor for Viewing Large Layouts on Small Screens"* ACM, Nov. 1993, pp. 81–90.

R. Finkelstein, "Understanding the Need for On–Line Analytical Servers," White Paper, URL: http://www.arborsoft-.com/papers/finkTOC.html (1995).

Arbor Software, "The Role of the Multidimensional Database in a Data Warehousing Solution," URL: http://www.arborsoft.com/papers/rolapTOC.html (1995).

Michael Spenke, Christian Beilken, and Thomas Berlage, "Focus: The Interactive Table for Product Comparison and Selection," In Proceedings of the ACM Symposium on User Interface Software and Technology (UIST), Nov. 6–8, 1996, pp. 41–50, Seattle, WA.

* cited by examiner

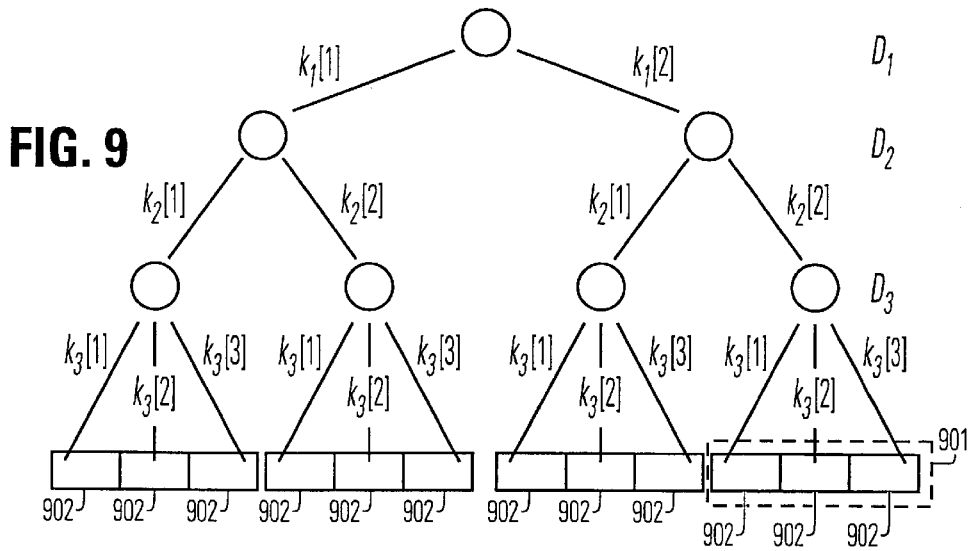
FIG. 9
FIG. 10
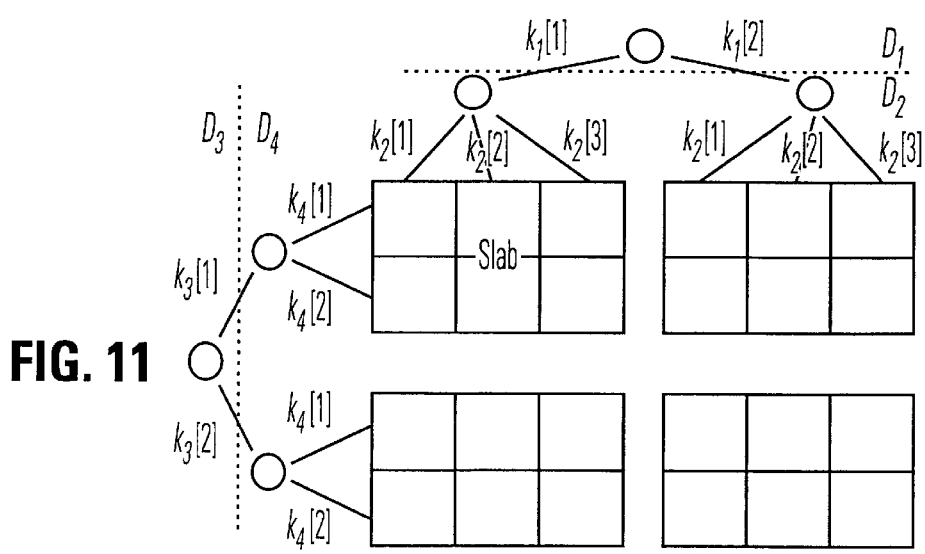
FIG. 11

| | | $k_1[1]$ | | | $k_1[2]$ | | | $L_1$ |
|---|---|---|---|---|---|---|---|---|
| $L_3$ | $L_4$ | $k_2[1]$ | $k_2[2]$ | $k_2[3]$ | $k_2[1]$ | $k_2[2]$ | $k_2[3]$ | $L_2$ |
| $k_3[1]$ | $k_4[1]$ | Slab | | | | | | |
| | $k_4[2]$ | | | | | | | |
| $k_3[2]$ | $k_4[1]$ | | | | | | | 1201 |
| | $k_4[2]$ | | | | | | | |

| Market | Stock Name | Month | Day | Year | Volume | High | Low | Close | Record |
|---|---|---|---|---|---|---|---|---|---|
| New York | Xerox | | | | | | | | |
| | SGI | 5 | 20 | 93 | 628800 | 36.5 | 35.375 | 36.5 | |
| | | 7 | 19 | 93 | 327600 | 38 | 36.375 | 37 | |
| | | 8 | 28 | 92 | 222400 | 22 | 21.25 | 21.875 | |
| | | 10 | | | | | | | |
| | | 11 | | | | | | | |
| | | 12 | | | | | | | |
| NASDAQ | Apple | 1 | 18 | 93 | 2.979e+06 | 60 | 58 | 59.5 | |
| | | 2 | | | | | | | |
| | | 3 | | | | | | | |
| | | | 31 | 93 | 1.991e+06 | 52.75 | 51.25 | 51.5 | |
| | | 4 | | | | | | | |
| | | 5 | | | | | | | |
| | | | 14 | 93 | 1.0483e+06 | 56 | 55 | 55.5 | |
| | | 6 | | | | | | | |
| | | 7 | | | | | | | |
| | | 8 | | | | | | | |
| | MicroSoft | | | | | | | | |
| | | 8 | 11 | 92 | 1.0443e+06 | 71.875 | 70 | 71.375 | |
| | Sun | | | | | | | | |

| Product | Year | Month | Units | Revenue | Profits | Salesperson | Record |
|---|---|---|---|---|---|---|---|
| FC Pro | 1990 | Jan | 90 | 38476 | 15006 | Barry | |
| | 1990 | May | 226 | 96616 | 37680 | Fred | |
| | 1991 | Jan | 195 | 83363 | 32512 | Barry | |
| | 1991 | May | 487 | 208193 | 81196 | Fred | |
| | 1992 | Jan | 26 | 11116 | 4335 | Fred | |
| | 1993 | May | 892 | 381330 | 148719 | Fred | |
| FM Server | 1990 | Jan | 45 | 427500 | 13893 | Barry | |
| | 1990 | May | 114 | 108300 | 35197 | Fred | |
| | 1991 | Jan | 108 | 102600 | 333450 | Barry | |
| | 1991 | May | 270 | 256500 | 833626 | Fred | |
| | 1992 | May | 13 | 123500 | 40138 | Fred | |
| | 1993 | Jan | 429 | 407550 | 132453 | Fred | |
| FM Access | 1990 | Jan | 11 | 10450 | 4076 | Barry | |
| | 1990 | May | 29 | 27550 | 10745 | Fred | |
| | 1991 | Jan | 20 | 19000 | 7410 | Barry | |
| | 1991 | May | 52 | 49400 | 19266 | Fred | |
| | 1992 | Jan | 2 | 1900 | 742 | Fred | |
| | 1993 | May | 76 | 72200 | 28158 | Fred | |

| Product | Year | Month | Units | Revenue | Profits | Salesperson | Record |
|---|---|---|---|---|---|---|---|
| FC Pro | 1990 | Jan | 90 | 38476 | 15006 | Barry | |
| | 1990 | May | 226 | 96616 | 37680 | Fred | |
| | 1991 | Jan | 195 | 83363 | 32512 | Barry | |
| | 1991 | May | 487 | 208193 | 81196 | Fred | |
| | 1992 | Jan | 26 | 11116 | 4335 | Fred | |
| | 1993 | May | 892 | 381330 | 148719 | Fred | |
| FM Server | 1990 | Jan | 45 | 427500 | 13893 | Barry | |
| | 1990 | May | 114 | 108300 | 35197 | Fred | |
| | 1991 | Jan | 108 | 102600 | 333450 | Barry | |
| | 1991 | May | 270 | 256500 | 833626 | Fred | |
| | 1992 | May | 13 | 123500 | 40138 | Fred | |
| | 1993 | Jan | 429 | 407550 | 132453 | Fred | |
| FM Access | 1990 | Jan | 11 | 10450 | 4076 | Barry | |
| | 1990 | May | 29 | 27550 | 10745 | Fred | |
| | 1991 | Jan | 20 | 19000 | 7410 | Barry | |
| | 1991 | May | 52 | 49400 | 19266 | Fred | |
| | 1992 | Jan | 2 | 1900 | 742 | Fred | |
| | 1993 | May | 76 | 72200 | 28158 | Fred | |

1601

1800

Product: ForeFinancial
Channel: Direct Sales
Saleperson: Summaries

| Totals | Units | Revenue | Profits |
|---|---|---|---|
| Mike Schough | 1396 | 6631000 | 3017111 |
| Barry Frank | 34 | 161500 | 73483 |
| Fred Ingmed | 315 | 1496250 | 680799 |
| Kevin Polen | 582 | 2764500 | 1257853 |
| John Spencer | 727 | 3453250 | 1571235 |
| Cookie Spencer | 206 | 978500 | 445223 |
| Sal Vitatone | 507 | 2408250 | 1095760 |
| Bj Quan | 292 | 1387000 | 631087 |
| Lincoln Wong | 1192 | 5662000 | 2576216 |
| Tracy Fox | 210 | 997500 | 453867 |
| Danny O'Brien | 718 | 3410500 | 1551784 |
| Ty Lee | 1208 | 5738000 | 2610794 |
| Viren Pate | 201 | 954750 | 434415 |
| Paul Pike | 1549 | 7357750 | 3347781 |
| Ben Park | 640 | 340000 | 1383207 |
| Kevin Tyler | 1145 | 5438750 | 2474635 |
| Andrew Zepp | 293 | 1391750 | 633249 |
| Wilma Stone | 297 | 1410750 | 641893 |
| Nancy Carr | 768 | 3648000 | 1659841 |
| Bill Muskrat | 438 | 2080500 | 946629 |

1900  Channel: Mail Order

| | | | Rebecca Green | | | Norma Jones | | |
|---|---|---|---|---|---|---|---|---|
| Year | Quart | Produ | Units | Revenue | Profits | Units | Reven | Profi |
| | | | | | | | | |
| | | | 12290 | 9438 | 17 | | | |
| | | | | 0 | | | | |
| | | | 5688 | 23750 | 165 | | | |
| | | | 9141 | 24376 | 130 | | | |
| | | | 47 | 4438 | | | | |
| | | | 24638 | 54750 | 73 | | | |
| | | | 13571 | 36188 | 193 | | | |
| | | | 8961 | 19913 | 59 | | | |

| Totals | Rebecca Green | | | Norma Jones | | | Channel: Mail Order<br>Product: Summaries |
| --- | --- | --- | --- | --- | --- | --- | --- |
| | Units | Revenue | Profits | Units | Revenue | Profits | |
| Foreword Pr | 86630 | 231005 | 1232 | 28832 | 76881 | 410 | |
| Forecode Pr | 2113805 | 4697331 | 13918 | 2415884 | 5368621 | 15907 | |
| Foremost Ac | 506597 | 1125750 | 1501 | 773560 | 1719000 | 2292 | |
| Foremost Li | 356001 | 791105 | 2344 | 203062 | 451242 | 1337 | |

FIG. 20

INTERACTIVE INTERFACE FOR VISUALIZING AND MANIPULATING MULTI-DIMENSIONAL DATA

Related Applications

Applicants claim the benefit of U.S. Provisional Application No. 60/067,242, filed on Dec. 2, 1997. This application is related to application Ser. No. 09/203,481, filed on Dec. 2, 1998, entitled "Method and System for Representing a Table With Multiple Focal Levels," by Ramana Rao and Tichomir Tenev.

FIELD OF THE INVENTION

The present invention relates generally to the field of data access and interaction, and more particularly to the analysis and visualization of multidimensional datasets.

DESCRIPTION OF THE RELATED ART

The need for organizing large bodies of data has lead to the development of many types of data management systems, ranging from simple files to relational databases. Although these systems provide suitable storage and query features, they are not very well suited for exploratory analysis, and using them requires a non-trivial degree of technical expertise.

In response to this problem, the field of On-line Analytical Processing (OLAP) has emerged. The basic premise of OLAP is that end users think of their data in terms of a number of dimensions and would like to be able to explore the data by manipulating these dimensions in a number of ways. For example, a business manager may think in terms of Products, Channels, Regions, Years, and so on. He may then want to perform operations such as rearranging views using different dimensions, slicing and dicing the data along various dimensions, drilling down into subgroups within a dimension, or rolling up subgroups into aggregate totals. An OLAP server allows users to perform these operations on data accessed from relational databases. Typically, a spreadsheet provides users an exploratory environment for visualization for slices of data. A number of quite powerful front-end tools suited to this kind of exploration of multidimensional data have been developed. However, these tools are still largely based on textual views and don't leverage powerful human perceptual abilities that could support exploration.

U.S. Pat. No. 5,632,009 to Rao et al., which is hereby incorporated by reference, describes a tool that allows users to view multivariate datasets (i.e., datasets having two dimensions, one dimension of variables and the second of cases associated with the variables) using a mixed graphical/textual representation of the data. This "focus+context" technique allows for the visualization and manipulation of large two-dimensional tables (roughly 30–100 times as big in the same screen space as a conventional spreadsheet or table browser). Because it displays much more of the table at once by using graphics to show values, a user can examine patterns in the whole table as well as zoom in on specific content without losing global context.

Although the focus+context technique, as described in the Rao patent, is a powerful tool for viewing and manipulating multivariate data, it does not allow for effective interaction and manipulation of multidimensional data. There is, therefore, a need in the art to provide efficient analysis and visualization of multidimensional data, such as the data manipulated by OLAP systems.

SUMMARY OF THE INVENTION

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, a first aspect consistent with the present invention includes a method of visualizing a multidimensional data set. The method includes the steps of (1) storing the multidimensional data set using an abstract data model partitioned into dimensions; (2) converting portions of the data set stored in the abstract data model into a visual model having dimensions of the abstract data model organized as at least one hierarchical tree; and (3) displaying the visual model to a user as a tabular representation on a computer display screen, wherein a first portion of the data of the data set is displayed in a first level of detail in the tabular representation and a second portion of the data in the data set is displayed in a second level of detail in the tabular representation, the first level of detail using more screen space per data value than the second level of detail.

A second aspect of the present invention is directed to a computer system comprising a processor, a display, and a memory. The memory includes computer instructions and computer data, the computer instructions when executed on the processor causing the processor to perform the functions of: (1) storing the multidimensional data set using an abstract data model partitioned into dimensions; (2) converting portions of the data set stored in the abstract data model into a visual model having dimensions of the abstract data model organized as at least one hierarchical tree; and (3) displaying the visual model to a user as a table in which a first portion of the data in the table is displayed in a first level of detail and a second portion of the data in the table is displayed in a second level of detail, the first level of detail using more screen space per data value than the second level of detail.

A third aspect of the present invention is directed to a method of invoking an operation on a data set having three or more dimensions comprising the steps of: (1) converting portions of the data set into a two-dimensional visual model; (2) displaying the visual model on a physical medium; (3) detecting a user's interaction with the data represented in the visual model; (4) initiating an operation on the data set based on the detected user interaction with the data; and (5) updating the visual model to reflect the operation initiated by the user.

BRIEF DESCRIPTION OF DRAWINGS

The accompanying drawings, which are incorporated in and constitute a part of this specification, illustrate several embodiments consistent with this invention and, together with the description, help explain the principles of the invention. In the drawings.

FIGS. 9 and 10 are diagrams illustrating a dimension hierarchy for a three dimensional data set of vault size 3×2×2;

FIG. 11 is a diagram illustrating the arrangement of two hierarchical trees associated with the horizontal and vertical screen axis;

FIG. 12 is a diagram illustrating tabular representation of the dimensional hierarchy shown in FIG. 11;

FIG. 13 is an illustration of an exemplary table image of a multidimensional data set;

Figure 15:
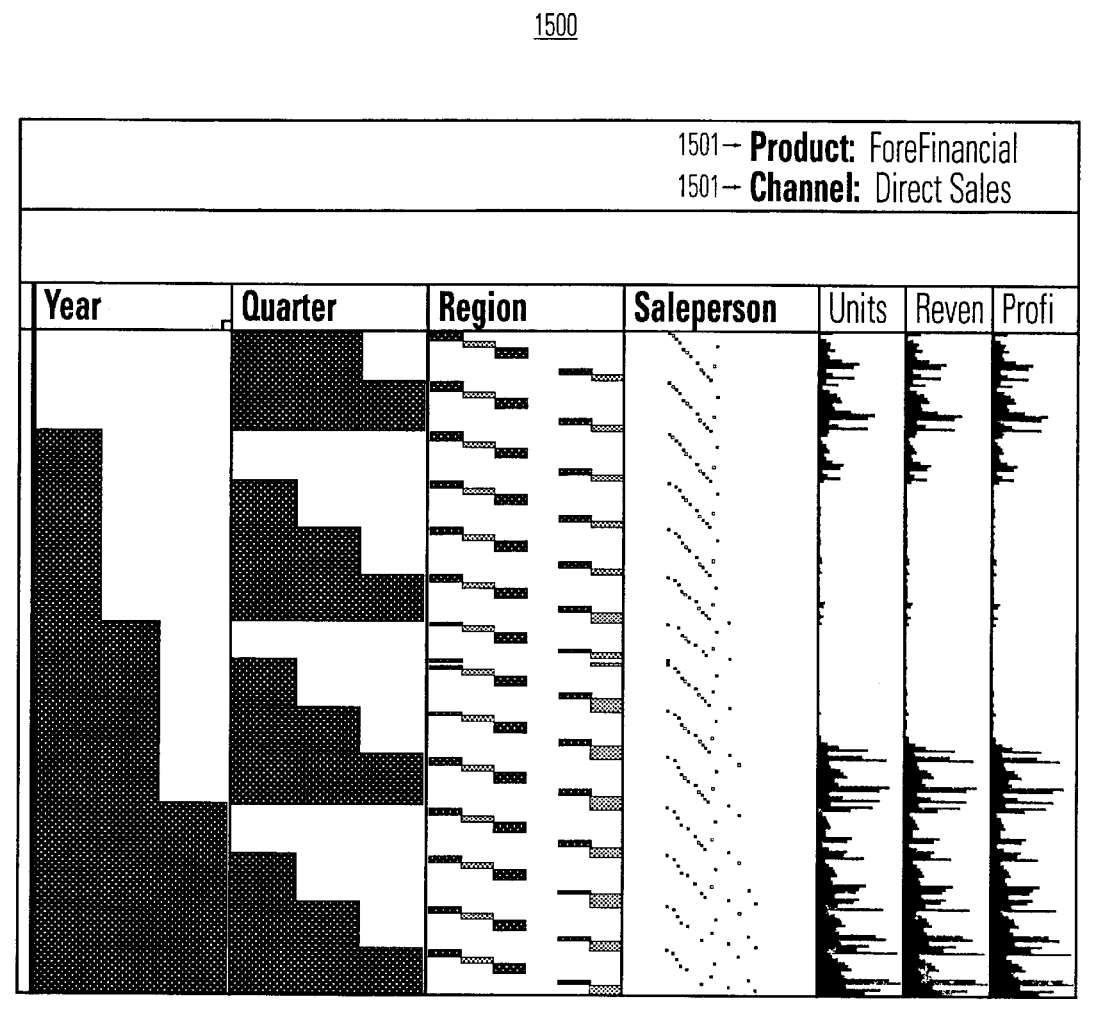

FIG. 15 is an illustration of a multidimensional data set after performing the select-slice operation;

FIGS. 16A, 16B, and 17 are illustrations of a multidimensional data set on which the promote/demote operations are performed;

FIG. 18 is an illustration of a multidimensional data set after performing the aggregate operation; and FIG. 19 and 20 are illustrations of a multidimensional data set after performing the repeat-variables operation.

DETAILED DESCRIPTION:

Reference will now be made in detail to embodiments of the invention, examples of which are illustrated in the accompanying drawings. Wherever possible, the same reference numbers will be used throughout the drawings to refer to the same or like parts.

A software visualization tool consistent with the present invention integrates OLAP functionality with focus+context based techniques for navigation through and inspection of large multidimensional datasets. The tool supports a number of operations including: select-slice, aggregation, promote/demote, repeat-variables, and sort.

I. The Physical System

Figure 1A:
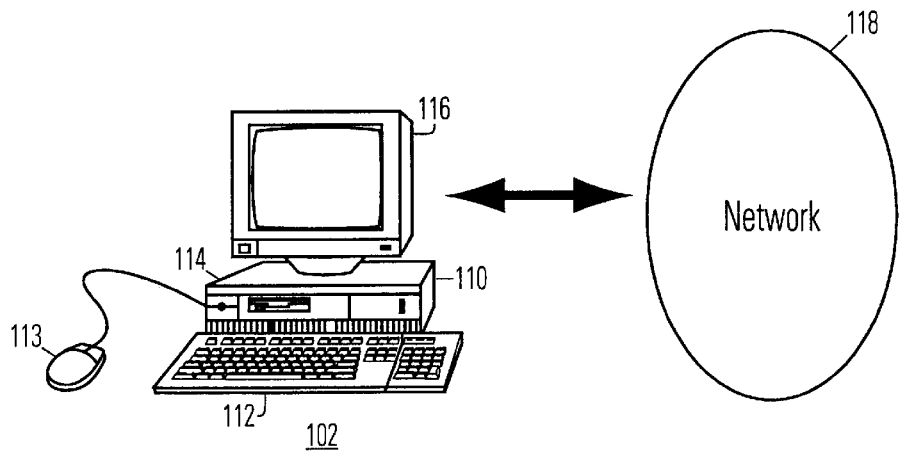
FIG. 1A is a block diagram of an exemplary computer system which may be used to implement a method consistent with the present invention.

FIG. 1A is a block diagram of an exemplary computer system used to implement the visualization tool. Computer system 102 includes a chassis 110, which holds the computer's main processor and main memory (in which the visualization tool may be stored); input devices such as keyboard 112, and a pointing device such as a mouse 113; a secondary storage device such as floppy or hard disk drive 114; and a display such as monitor 116. Computer system 102 is optionally connected to a network 18, and may be operated directly by a user or through network 118.

Many variations of computer system 102 are possible. For example storage device 114 may additionally include storage media such as optical disks, and mouse 113, may additionally or alternatively include other pointing devices such as a trackball, a lightpen, a touch-sensitive pad, a digitizing tablet, or a joystick.

Figure 1B:
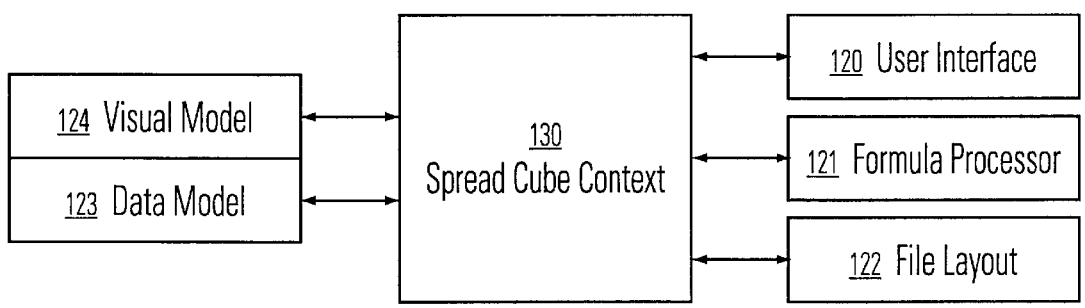
FIG. 1B is a block diagram showing the interaction of software components consistent with the present invention.

FIG. 1B is a block diagram showing the software components of the visualization tool. The user interacts with the visualization tool through user interface 120, which is displayed on monitor 116. Formula processor 121 parses arithmetic expressions input by the user and may create new variables for addition to the data model. File layout component 122 parses the input data and feeds it to data model module 123, which contains an abstract data model (described in more detail below). Visual model module 124 contains rules for converting the abstract data model in data module 123 to a form representable on display 116.

Context object 130 acts as an intermediary between components 120–122 and 123–124. More specifically, context object 130 performs methods which convert information flowing between elements 120–124, if necessary. Thus, context object 130 allows for simplification from both a technical and a practical point of view. For example, formula processor 121 does not need to know what the interface to the data model is, even though its results may eventually be integrated into the data set. Instead, it calls a method in context object 130, which later calls the appropriate method in data model 123. Similarly, the user interface 120 communicates with the visual model through context object 130.

II. The Abstract Multidimensional Data Model

In one embodiment, the visualization tool stores and retrieves data for visualization using an abstract data model, such as a multidimensional data cube. The word "abstract" signifies that the data model does not directly correspond to how data is represented in memory or visualized on the screen. Based on the user's commands, the abstract data model is reduced to a visual model which may then be viewed on computer monitor 116.

The following defintions apply to the abstract data model and the visual model:

A value is the smallest unit of data which continues to have meaning in the physical world. There can be even smaller units of data, like bits and bytes, but they are only relevant to how a value is represented, not what it means.

A variable is an attribute of a physical system in consideration which gives rise to data values. For example heart rate, atmospheric pressure, gross domestic product, and revenue are all variables.

A dimension is an independent partitioning of the set of all values according to some aspect of the state of the system incidental with each value. Each partition is labeled by a dimension key. For example, a set of revenue values may belong to a variable in the company marketing system. The set can be partitioned according to the product responsible for a particular revenue value, and also according to the year when such revenue was generated. Therefore, "year" and "product" are two dimensions of the company marketing system.

A multidimensional data set comprises data from a single physical system. A single physical system can be described in terms of multiple dimensions, one of which defines multiple variables. For example the description of the company marketing system may include several dimensions such as "distribution channel," "product," and "year," and contain several variables such as "profits" or "units sold."

In summary, each value in a multidimensional data set belongs to a variable within a physical system. The context of each value observation corresponds to the state of the system incidental with that observation.

A. Dimension Key Structure

A dimension key is a characterization of a relevant aspect of the system's state. A key can be simple or compound A simple key represents the finest interesting partitioning of the data set along its respective dimension. For example, the "male" and "female" keys of the gender dimension are simple because they represent the finest possible partitioning according to gender.

Figure 2:
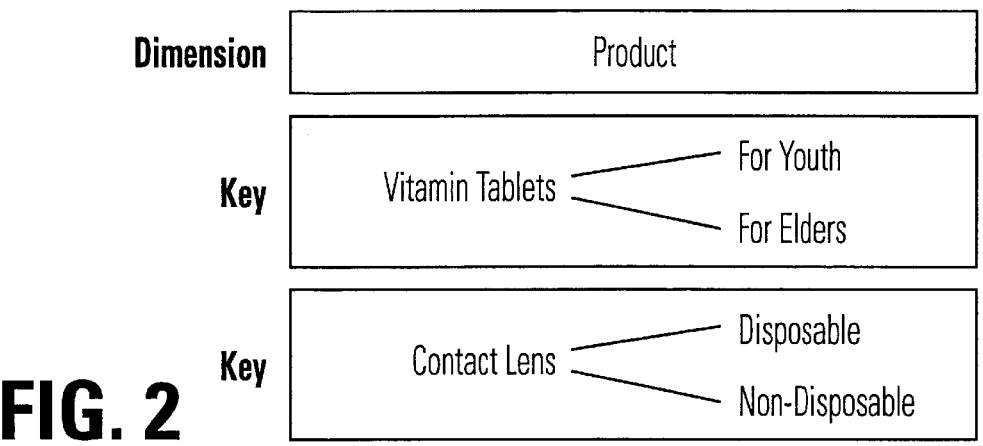
FIGS. 2–4 are diagrams illustrating the relationship between dimensions and dimension keys.

A compound key is in fact a hierarchy of keys which label finer partitions. For example, as shown in the dimension key hierarchy of FIG. 2, the partitions associated with the keys "Contact Lens" and "Vitamin Tablets," of the product dimension, could be partitioned further into "Disposable Contact Lens" and "Non-Disposable" contact lens, and "Vitamin Tablets for the young" and "Vitamin Tablets for the elder." Attributes such as "Disposable," "Non-Disposable" cannot be taken out of the context of the key hierarchy, because they only apply to one dimension key, namely "Contact Lens."

Figure 3:
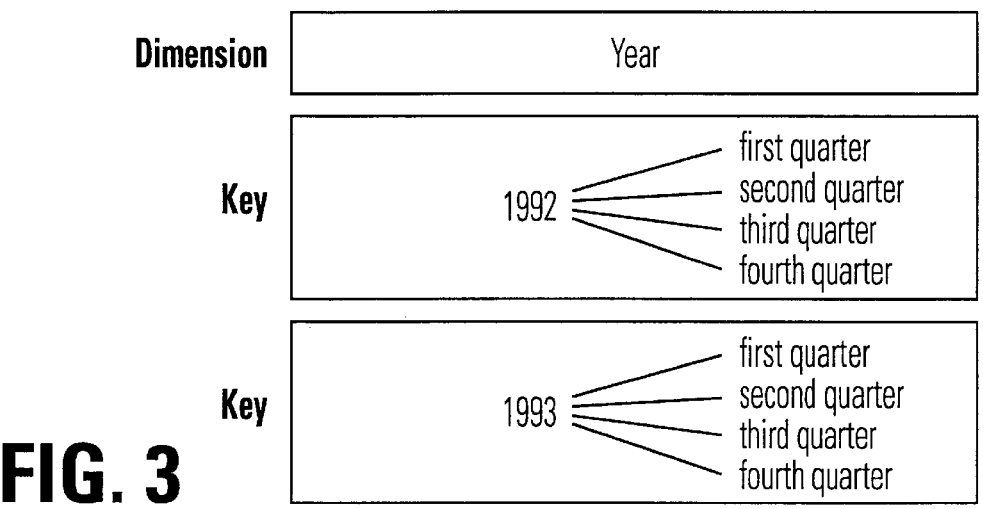

There is also an intermediate key between simple and compound, called a pseudo-compound key. Consider the "Year" dimension of the company marketing system. A "Year," as shown in FIG. 3, can be further partitioned into four quarters.

Figure 4:
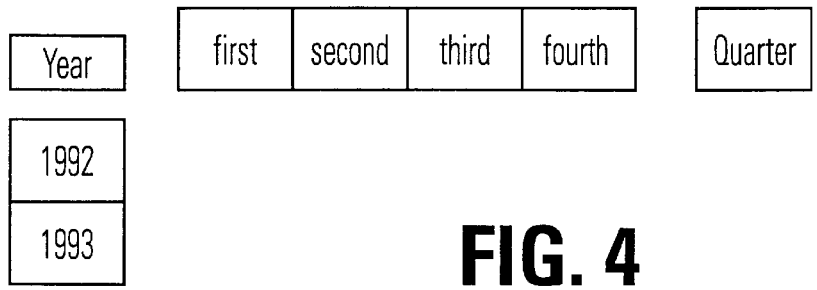

The difference between a pseudo-compound key and a compound key is that the sub-partitions of a pseudo-compound key repeat over all the keys of that dimension. For example, all years in the "year" dimension have four quarters. This situation occurs very often especially with dimensions which quantify time and space. In such cases, even though it seems that a quarter is an inherent part of a particular year, it is reasonable to speak of a quarter outside the context of that year. For example, studying yearly fluctuations in the company's marketing might include examining how variables such as "profits" and "revenue" behave as fictions of the quarter regardless of the actual year. Thus, for all practical purposes, years and quarters behave as the keys of two independent dimensions, as illustrated in FIG. 4.

B. Record and Set Dimensions

Integrating values from different variables into a single data set can be handled uniformly, consistent with the multidimensional data model, by designating a special dimension whose keys correspond to the existing variables. This special dimension is called the record dimension and all other dimensions are called set dimensions. Thus, a set of values whose dimension keys are all equal, except for the record dimension key, are incidental with the same system state and represent a record of observations; hence the name "record dimension." On the other hand, a set of values with the same record dimension key are a set of observations of the same variable; hence the name "set dimension."

The keys of a record dimension are variable descriptors. Each variable descriptor consists of a variable label, e.g. "profits," and a value domain. The value domain characterizes the type of operations that are meaningful to the values of the variable referred to by the variable descriptor.

C. Value Domains

Depending on the variable to which a value belongs, it may participate in certain data operations and not others. For example, the values of the "revenue" variable can be added together or ordered, whereas the values "red," "green" and "blue" of the "color" variable cannot.

Values belonging to the same variable are able to participate in the same data operations. Depending on the data operations of the current data model, it may be possible that the same set of operations is applicable to the values of several variables. We can classify values into value domains according to the set of operations on the values which are meaningful.

Exemplary value domains include:

Nominal. These values belong to a finite set. They can only be tested for equality but cannot be ordered. For example, the three primary colors are nominal values.

Quantity. These values represent an amount of something. They can be tested for equality and can be ordered. In addition, they can be added together or multiplied by a fraction. For example, height, pressure, profits, etc. are variables with quantity values.

Textual. These are values which support typical string operations, like concatenation and search. For example, the values of the variable "remarks".

III. The Abstract Data Model Used By The Visualization Tool

The previous section described the general notion of the multidimensional data model and its components. The visualization tool uses an instance of the multidimensional data model having particular operations, value domains, and terminology. Even though the data model used by the visualization tool is more specific than the general multidimensional data model described in the previous section, it will continue to be referred to herein as the "abstract" data model to distinguish it from the "visual" model. One of ordinary skill in the art will recognize that alternate instances of the multidimensional data model other than the one described here could equivalently be used.

Figure 5:
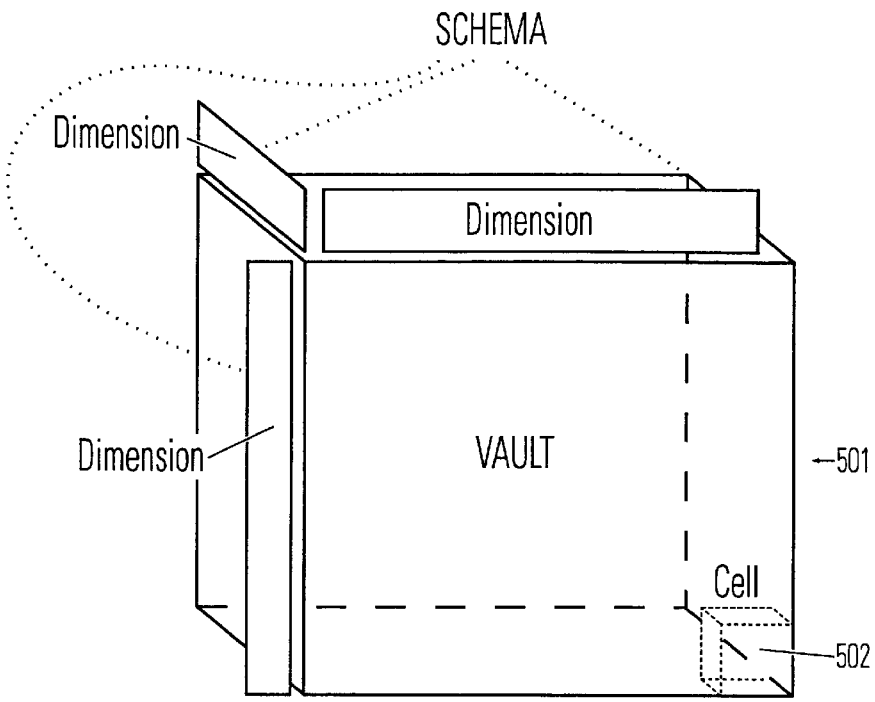
FIGS. 5 and 6 are diagrams illustrating N-dimensional data sets.

An N-dimensional data set used by the data visualization tool can be expressed in terms of spatial relationships. In such case the data values are organized into an N-dimensional array, such as the N-dimensional array 501 shown in FIG. 5. Vault 501 is a multidimensional array of cells, where a single cell 502 is a placeholder for a single value. The context in which the value is observed is encoded by the spatial position of the cell.

Figure 6:
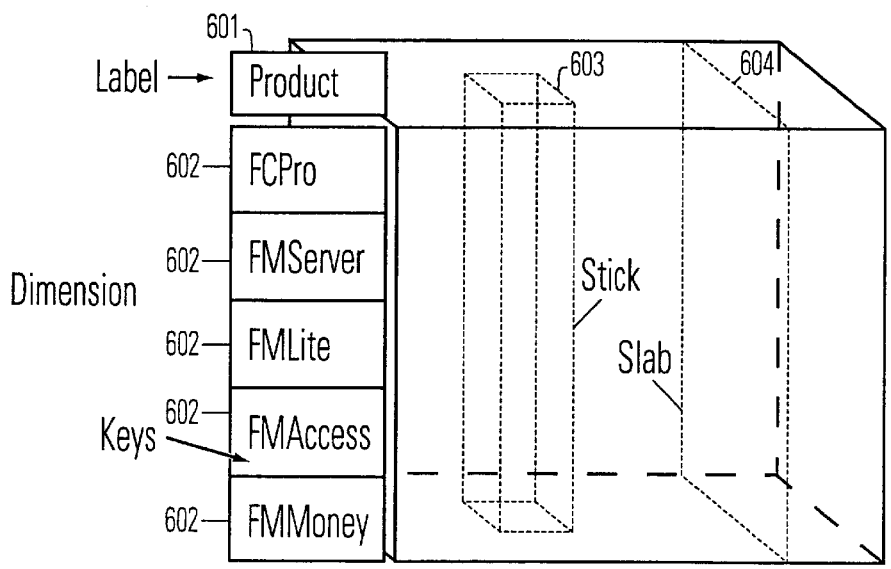

The structure consists of N dimension objects. A dimension object has of a list of unique keys and a label. As shown in FIG. 6, label 601 ("Product") is the name of the dimension. Keys 602 correspond to spatial coordinates. Therefore, since each cell in the vault is specified by an N-tuple of spatial coordinates, it can be also specified by an N-tuple of dimension keys. The correspondence between spatial coordinates and dimension keys is what establishes the correspondence between the cell's spatial position and the interpretation of its value.

Stick 603 is a unidimensional group of cells parallel to a dimension. The cells within a stick share all but one spatial coordinate, i.e., they share all but one dimension key.

Figure 7:
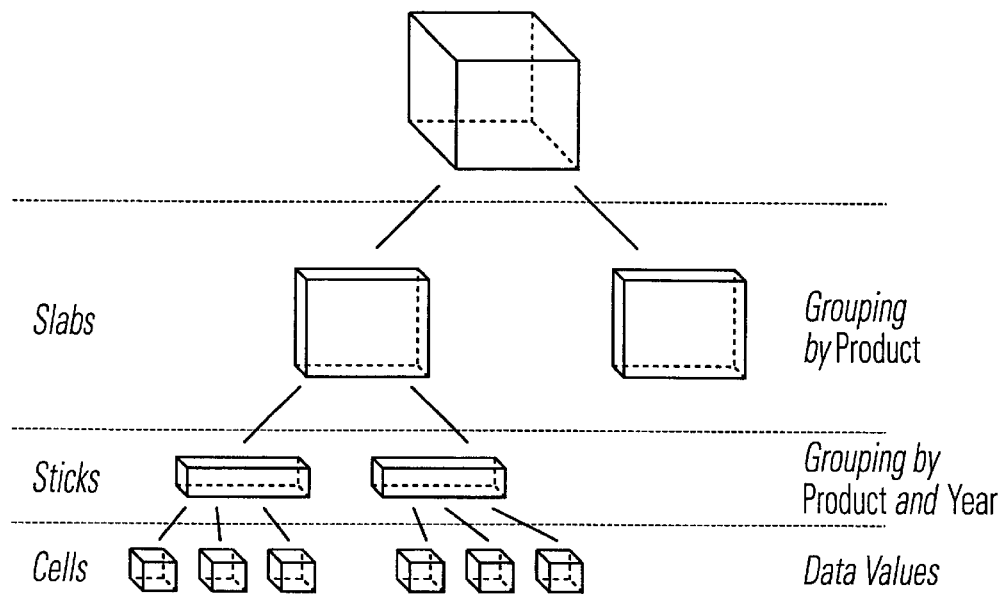
FIG. 7 is a diagram illustrating grouping of sticks and slabs of an N-dimensional data set.

Slab 604 is a two dimensional group of cells parallel to two of the dimensions. The cells within a slab share all but two of the dimension keys. A slab is basically a grouping of parallel sticks. FIG. 7 illustrates the grouping of sticks into slabs, and slabs into 3-dimensional blocks. The groupings shown in FIG. 7 correspond to successive levels in a data consolidation path.

Figure 8:
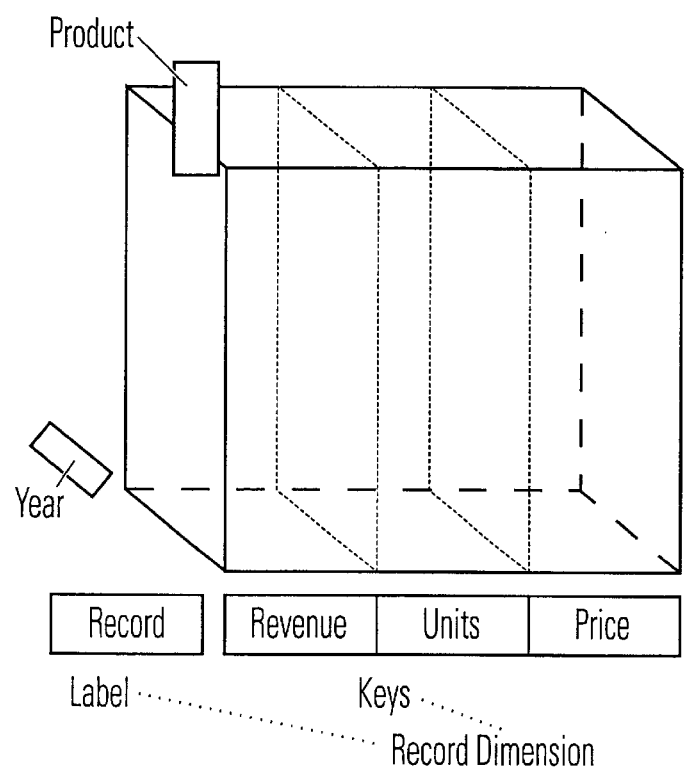
FIG. 8 is a diagram illustrating dimensional planes perpendicular to the record dimension.

As shown in FIG. 8, cells whose values belong to the same variable form (N−1) dimensional structures perpendicular to the record dimension.

IV. The Visual Model

The visual model is the projection of the abstract data model on a visual medium, such as two-dimensional computer display screen 116. The visual model contains components similar to the components in the abstract data model. Because of the constraint that every visual component must have a straightforward two-dimensional representation, however, the visual model loses some of the simplicity of the abstract data model. For example, in order to visualize multiple dimensions, a dimension hierarchy is introduced.

In order to avoid confusion between the dimensions of the abstract multidimensional model and the dimensions of the screen, the screen dimensions will be referred to as axes. A screen has two axes: a horizontal axis and a vertical axis.

A. Linear Dimension Hierarchy

Before introducing the idea of a planar dimensional hierarchy, such as that of a computer screen, it is useful to describe the simpler concept of a linear dimensional hierarchy.

In a linear dimensional hierarchy, the visual vault is a collection of sticks, aligned along a single screen axis. The dimensions are arranged in a chosen order of seniority. For purposes of illustration, and without loss of generality, assume that the order is chosen to be: $D_1, D_2, \ldots, D_N$; where $D_1, D_2, \ldots D_N$ are each dimensions from the set of N dimensions. Given this order of dimensions, the top level of the hierarchical tree corresponds to $D_1$ and the branches correspond to the keys of $D_1$, the level of nodes below corresponds to $D_2$ and so on. This concept is illustrated in FIG. 9. Leaves 902 of the tree store the actual data values. Furthermore, the leaves of any node from the lowest level of the tree contain data values which share all but one dimension key and therefore those data values form a stick, such as stick 901.

The example shown in FIG. 9 illustrates the dimension hierarchy for a three-dimensional data set, with an abstract vault size of 3×2×2. The hierarchical tree describes the arrangement of sticks along a particular screen axis. As shown, stick 901 is associated with the horizontal screen axis.

A more compact way of representing the dimensional hierarchy of FIG. 9 is shown in FIG. 10, in which the branches are represented by boxes and the nodes are omitted. This is referred to as the tabular representation of the dimension hierarchy. Each level of the hierarchy is labeled by the label of the corresponding dimension.

B. Planar Dimensional Hierarchy

In the case of a planar dimensional hierarchy, the visual vault is a collection of slabs tiled in the plane of the two screen axis. The visual schema consists of two hierarchical trees associated with the horizontal and vertical screen axes. These hierarchies determine the arrangement of the slabs on the screen, as shown in FIG. 11.

The two hierarchical trees contain two complementary sets of dimensions. Within each tree the dimensions are arranged in a seniority order. There is no such ordering defined between dimensions from different hierarchical trees. As shown in FIG. 11, dimension $D_3$ is senior to dimension $D_4$ and dimension $D_1$ is senior to dimension $D_2$.

Similar to the linear dimensional hierarchy shown in FIG. 9, the leaves of the dimension trees in FIG. 11 contain data values. However, unlike the hierarchy in FIG. 9, each leaf contains an entire row or column of data cells depending on whether the hierarchical tree is associated with the horizontal or vertical axis. Since a data cell can belong to exactly one row-column pair, a cell is completely specified by a pair of leaves from each tree.

The tabular view representation of the dimensional hierarchy from FIG. 11 is shown in FIG. 12.

To provide a compact representation of the abstract data model, the visual model may suppress the representation of data cells with nonexistent values (i.e., values not defined) whenever it is possible to do so without creating inconsistencies. For example, if all cells in row 1201 addressed by $k_4$ [2] in FIG. 12 contained nonexistent data values, then row 121 would be eliminated and the gap created would be closed by shifting the bottom of the table up, without altering the spatial relationships among the rest of the cells.

On the other hand, if only half of the cells of row 1201 had nonexistent values, e.g. the cells addressed by $k_4$ [2] and $k_1$ [1], then these cells 1201 would remain represented in the visual model.

The rules for suppressing the representation of cells in the visual model may be summarized as follows:

To preserve the spatial relationships between cells, only entire groups should be eliminated.

In order to represent all essential data, only empty groups can be eliminated, i.e., groups of cells with nonexistent data values.

C. Operations on the Visual Model

The user invokes operations on the abstract data model by operating on the visual model. The result of those operations are conveyed to the user through the visual model. The set of operations on the visual model act as an interface to the operations on the abstract data model.

FIG. 13 illustrates a table image 1300 of a multidimensional data set showing a focus+context representation. More particularly, table 1300 is a visualization of stock market data, which contains the following values for each of a number of days for various securities: volume (column 1301), highest price (column 1302), lowest price (column 1303), and closing price (column 1304). Each of values 1301–1304 is partitioned by the dimensions date (columns 1310), security name (column 1314), and stock market (column 1315). In other words, for any given combination of date, stock name, and stock market, there is not more than one possible value for volume, highest price, lowest price, and closing price.

The data model represented by table 1300 has four dimensions: three set dimensions for date, stock name, and stock market, and one record dimension for the variables volume, highest price, lowest price, and closing price. The date dimension is actually a compound dimension consisting of the pseudo-compound keys year (column 1311), month (column 1312), and day (column 1313). Altogether there is one record dimension and three set dimensions, one of which has a 3-level compound structure. The three levels of the date dimension may be treated as separate dimensions.

As shown, the values in columns 1301, 1302, 1303, and 1304, are sorted based on the single dimensional hierarchy tree given by: market, stock name, and date. Further, the user has focused on certain values in table 1300, causing these values to become fully visible in their textual representation. These values are labeled as areas 1330. Other values in table 1300, such as the values labeled 1340, are not focused. These values are in the "context," and are represented graphically. In one embodiment, the user may choose either a focus view or a context view via a simple manipulation of a pointing device, such as a mouse. As previously mentioned, the focus+context technique allows values of particular interest to the user to be displayed using a high focus level, i.e., using the full textual representation of the value. The human operator controls the areas to focus on using an input device such as pointing device 113.

A user may manipulate the data shown in table 1300 to, for example, "slice and dice" the data along various dimensions, "drill down" into subgroups within a dimension," or "rollup" subgroups into aggregate totals. A number of multidimensional focus+context operations are supported by the visualization tool to achieve these objectives. For example, the user may drag the tile labeled "high" (which corresponds to the "high" record variable) in table 1300 and place it between the tiles labeled "low" and "close," causing the visualization tool to redraw table 1300 with column 1302, corresponding to the "high" variable, located between columns 1303 and 1304.

In addition, several other operations are supported by the visualization tool. These additional operations, described in more detail below, allow the user to move between multi-dimensional views of the data set. These operations will be explained with reference to FIGS. 14–20, which illustrate a multidimensional data set displayed as tables using the focus+context technique.

Table 1400 is a business multidimensional data set having six dimensions: years/quarters (columns 1401), products (column 1402), product distribution channels (column 1403), sale regions (column 1404), salespersons (column 1405), and the record dimension (columns 1406). The record dimension includes the line item values: units (column 1407), revenue (column 1408) and profit (column 1409). Each of the dimensions shown in columns 1401–1404 has multiple keys. For example, the product dimension (column 1402), contains multiple keys, such as keys 1420–1423. Keys 1420–1423 may correspond-to products such as the "ForeFinancial" product or the "ForeRecreation" product.

1. The Select-Slice Operation

The select-slice operation slices a dimension D at a specific key value y of the dimension to produce a data model with one less dimension and which only contains the values addressed by V. Slicing the data set allows the user to navigate to a subset of interest in the data set. In one embodiment, the select-slice operation is preferably initiated by the user with a simple gesture using pointing device 113, such as pointing to a predetermined section of the column dimension to be selected and "flicking" (i.e., quickly moving) the pointing device in a predetermined direction, such as northeast.

Figure 14:
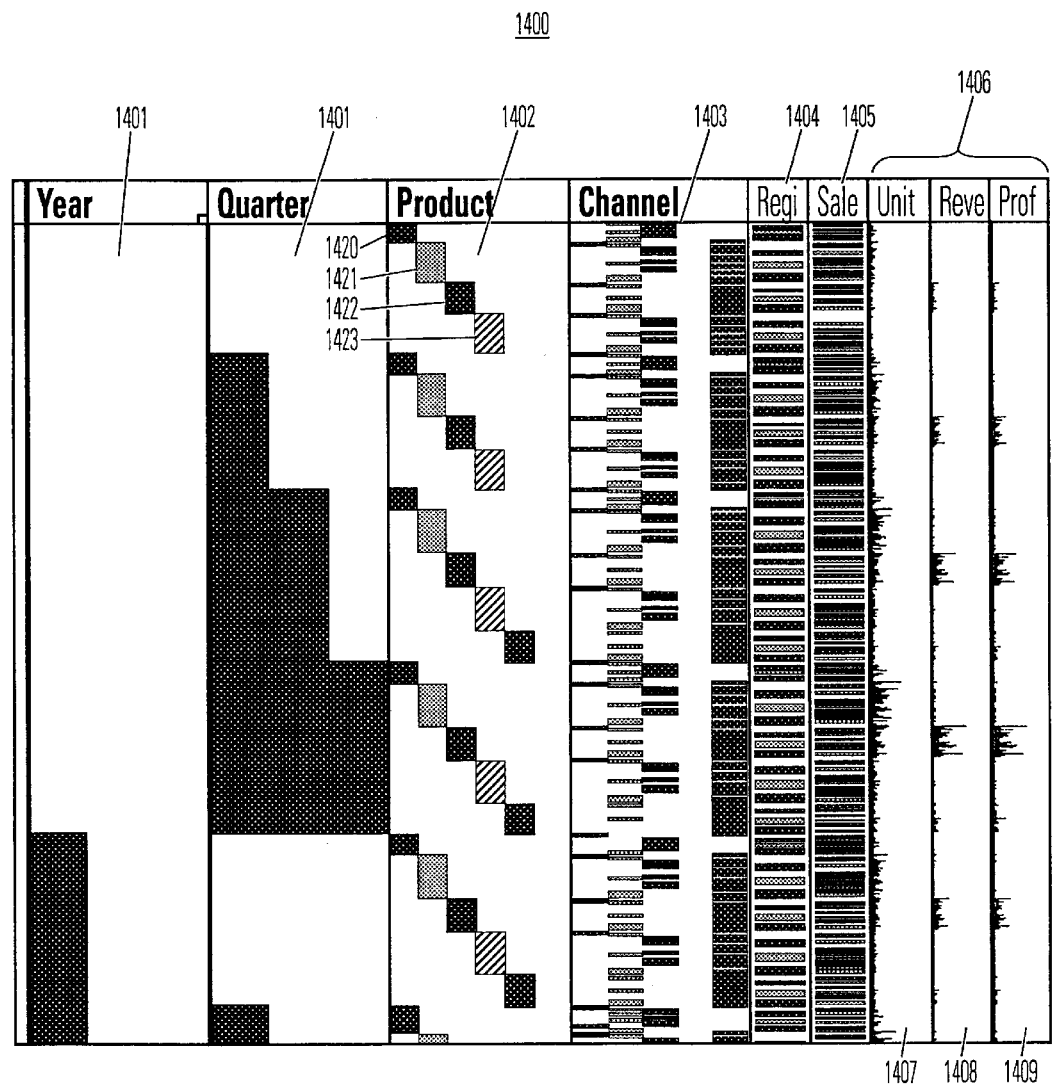
FIG. 14 is an illustration of a typical business multidimensional data set.
Figure 17:
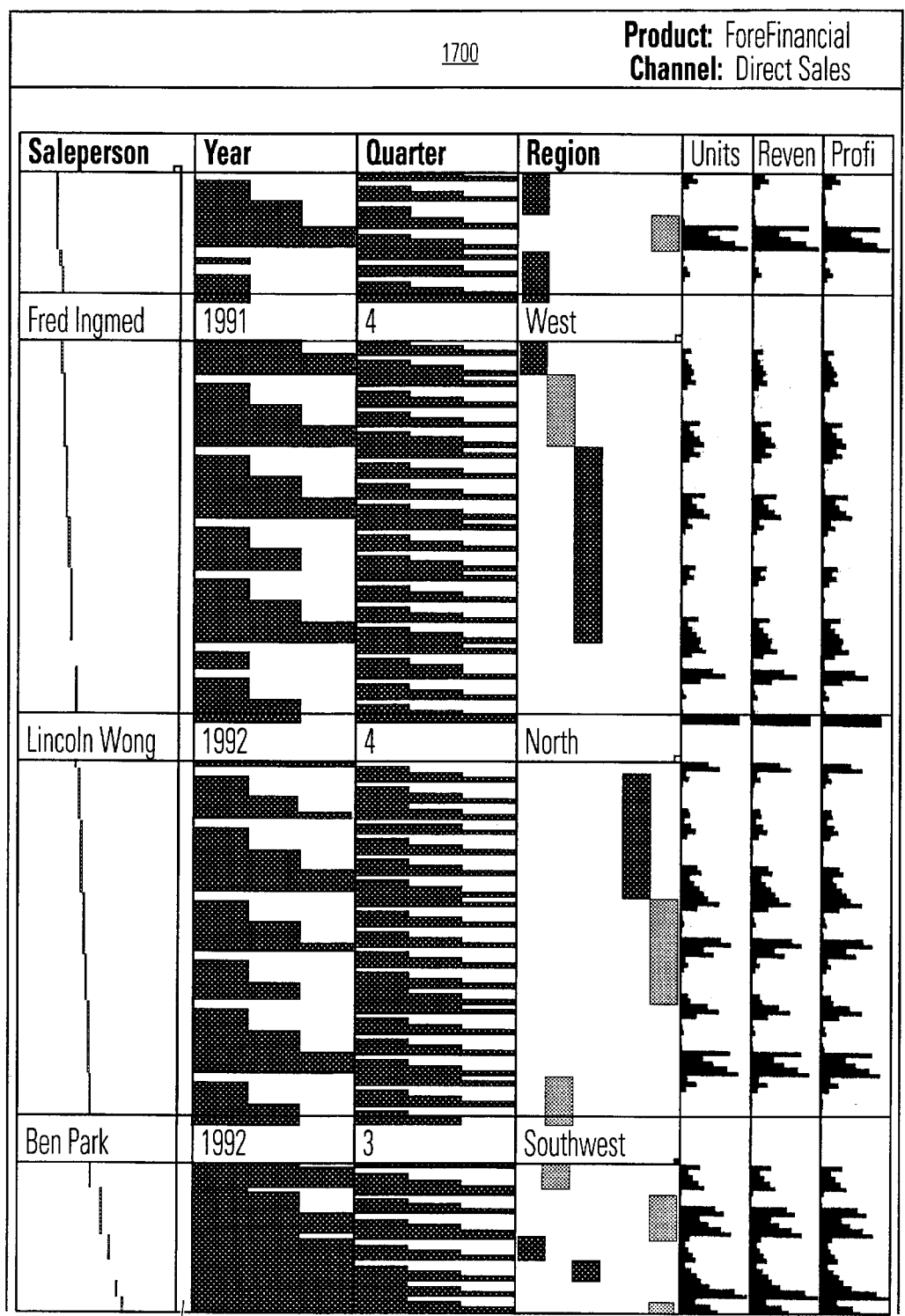

Table 1500 illustrates the data set of FIG. 14 after performing the select-slice operation twice successively on product dimension 1402 and on channel dimension 1403. The other dimensions remain encoded in the slice and continue to exhibit the cyclical patterns reflective of their nature as dimensions.

As shown, product dimension 1402 and channel dimension 1403 are no longer encoded in table 1500. These two dimensions, and the subgroup of the dimension they are frozen at (i.e., the "ForeFinancial" product sold through the "Direct Sales" sale channel), are shown in menu section 1501 of table 1500. The units, revenue, and profit variables 1502 contain values for the ForeFinancial product sold through the direct sales channel, and hierarchically sorted based on year, quarter, region, and-salesperson.

The slicing operation can be used to focus on a selected subset of the data. Slicing n−2 times will zoom on one particular slab defined by the remaining two dimensions. Slicing one more time will produce a stick, and finally slicing again will produce one value addressed by the sliced values for each dimension. This is often referred to as a "hierarchical drill-down."

2. The Promote/Demote Operations

The promote and demote operations are complements of one another. These operations can be applied to either axis of the visual model.

The demote operation reduces the dimensionality of the visualized data set by merging the slabs at the lowest level of the dimensional hierarchy of the target axis. Stated more formally, when a dimension is demoted, the dimension is represented as a variable, and the variable is populated with values that were the keys of the dimension.

FIG. 16A illustrates an exemplary data set before applying the demote operation. The demote operation is preferably initiated by the user by moving a mark on the target axis. The mark is shown in FIG. 16A as the thick vertical line 1601. As shown in FIG. 16B, mark 1601 has been moved to the left of the "Year" and "Month" dimensions, thus demoting these dimensions to the level of the record variables. That is, the "Year" and "Month" dimensions are encoded in the table as data values.

The promote operation is the reverse of the demote operation. In the promote operation, dimension variables are represented as a dimension in which the values of the dimension variables become keys of the dimension.

The demote operation discussed above may be reversed by promoting the "Year" and "Month" columns in FIG. 16B. This operation may be initiated by moving the mark 1601 to the right of the "Year" and "Month" columns. The result of this promotion is show in FIG. 16A.

Table 1700 also-illustrates the promote operation, in which the salesperson dimension has been promoted. In table 1700, the salesperson dimension of table 1600 has been moved to the far left (top of the dimension hierarchy) of axis mark 1701. The "Year," "Quarter," and "Region" dimensions have been demoted to the level of the record variables.

In summary, the promote operation converts variable values to keys of a dimension, while the demote operation converts dimension keys to variable values.

3. The Aggregate Operation

The variables may be aggregated over a promoted dimension to generate summary values corresponding to the sticks or slabs referring to each of the dimension keys. This operation is called the aggregate operation. The summary information may include, for example, totals, averages, or extreme values. Table 1800 illustrates the result of the aggregate operation applied to table 1700, in which sticks of table 1700 referring to the salesperson dimension have been aggregated and the aggregated values have been focused on and the non-focused values removed from the visual display. Aggregated table 1800 may be used, for example, in a final presentation document.

4. The Repeat-Variables Operation

FIG. 19 illustrates the use of the repeat-variables operation. The repeat-variables operation takes the particular items of a dimension and repeats all the non-dimensional columns (i.e., the items of the variables dimension) underneath the items of the dimension. Table 1900 has had the select-slice operation performed on it, selecting the slice corresponding to the "mail order" portion of the "channel" dimension. The select-slice operation has left data for two salespersons, labeled "Rebecca Greep" and "Norma Jones." The repeat-variables operation duplicates the units, revenues, and profit variable for each of the two salespersons.

FIG. 20 illustrates a summary table 2000. By further aggregating on the products dimension and focusing on the summaries of table 1900, table 2000 is generated, which is a summary table similar to table 1800.

Functionally, the repeat-variables operation is equivalent to a promotion on the horizontal axis; and is thus a specialized version of the promote operation.

5. The Sort Operation

The sort operation sorts the sticks along a column or a row of the visual model. The sort operation is preferably initiated by the user with a flick gesture along the target row or column, the direction of which indicates the direction of the sort (i.e., ascending or descending). When a stick is sorted, the same permutation is applied to the sticks parallel to it.

One use of the sort operation is to determine how well two parallel sticks are correlated: if after sorting one stick, the other stick appears to be more or less sorted then the two sticks are fairly correlated.

The software visualization tool described above allows easy and intuitive navigation of a multidimensional data set. Focus+context based navigation techniques have been used to increase the clarity and information content provided to the user. The visualization tool supports a number of operations including: select-slice, aggregation, promote/demote, repeat-variables, and sort.

It will be apparent to those skilled in the art that various modifications and variations can be made to the present invention without departing from the scope or spirit of the invention. For example, although the above aspects of the present invention were described using a two-dimensional visual model, a three dimensional visual model could also be used to present the data set to the user. The three dimensional visual model would be organized as multiple levels of tables that form a three dimensional rectangle.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed:

1. A method of visualizing a multidimensional data set comprising the steps of:
   storing the multidimensional data set using an abstract data model partitioned into dimensions;
   converting portions of the data set stored in the abstract data model into a visual model having dimensions of the abstract data model organized as at least one hierarchical tree; and
   displaying the visual model to a user as a tabular representation on a computer display screen, wherein a first portion of the data of the data set is displayed in a first level of detail in the tabular representation and a second portion of the data in the data set is displayed in a second level of detail in the tabular representation, the first level of detail using more screen space per data value than the second level of detail,
   wherein the at least one hierarchical tree is displayed with the visual model and includes a first dimension hierarchy associated with either a horizontal axis or a vertical axis.

2. The method of claim 1, wherein the first level of detail includes a textual representation of the data and the second level of detail includes a graphical representation of the data.

3. The method of claim 1, wherein the first dimension hierarchy is associated with the horizontal axis and wherein the at least one hierarchical tree further includes a second dimension hierarchy associated with the vertical axis.

4. The method of claim 1, wherein a row in the tabular representation is not displayed to the user when all the values in the row are empty.

5. The method of claim 1, wherein the converting and displaying steps are performed in response to a user's command.

6. The method of claim 5, wherein the user's command initiates a demote operation that reduces the dimensionality of the visual model by converting dimension keys to variable values.

7. The method of claim 6, wherein the demote operation is initiated when the user moves a mark on an axis in the visual model.

8. The method of claim 6, wherein the demote operation is initiated when the user drags a tile representing a dimension.

9. The method of claim 5, wherein the user's command initiates a promote operation that increases the dimensionality of the visual model by converting variable values to dimension keys.

10. The method of claim 5, wherein the user's command initiates a repeat-variables operation that causes values corresponding to selected keys of a dimension to be repeated in the visual model for each of the selected keys.

11. The method of claim 5, wherein the user's command initiates a select-slice operation that removes a selected dimension from the visual model.

12. The method of claim 1, wherein the visual model is a three-dimensional visual model.

13. A computer system comprising:
    a processor;
    a display coupled to the processor;
    a memory coupled to the processor, the memory including computer instructions and computer data, the computer instructions when executed on the processor causing the processor to perform the functions of
       storing the multidimensional data set using an abstract data model partitioned into dimensions;
       converting portions of the data set stored in the abstract data model into a visual model having dimensions of the abstract data model organized as at least one hierarchical tree; and
       displaying the visual model to a user as a table in which a first portion of the data in the table is displayed in a first level of detail and a second portion of the data in the table is displayed in a second level of detail, the first level of detail using more screen space per data value than the second level of detail,
    wherein the at least one hierarchical tree is displayed with the visual model and includes a first dimension hierarchy associated with either a horizontal axis or a vertical axis.

14. The computer system of claim 13, wherein the first level of detail includes a textual representation of the data values and the second level of detail includes a graphical representation of the data values.

15. The computer system of claim 13, wherein the first dimension hierarchy is associated with the horizontal axis, and wherein the at least one hierarchical tree further includes a second dimension hierarchy associated with the vertical axis.

16. The computer system of claim 13, wherein a row in the tabular representation is not displayed to the user when all the values in the row are empty.

17. The computer system of claim 13, wherein the computer instructions for performing the converting and displaying functions are executed in response to a user's command.

18. The computer system of claim 17, wherein the user's command initiates a select-slice operation that removes a selected dimension from the visual model.

19. The computer system of claim 17, wherein the user's command initiates a demote operation that reduces the dimensionality of the visual model by converting dimension keys to variable values.

20. The computer system of claim 19, wherein the demote operation is initiated when the user moves a mark on an axis in the visual model.

21. The computer system of claim 17, wherein the user's command initiates a repeat-variables operation that causes values corresponding to selected keys of a dimension to be repeated in the visual model for each of the selected keys.

22. A method of invoking an operation on a data set having three or more dimensions comprising the steps of:

displaying a two-dimensional visual model on a physical medium representing portions of the data set, the visual model having dimensions of the data set represented as at least one hierarchical tree;

detecting a user's interaction with the data represented in the visual model; and initiating an operation on the data set based on the detected user interaction with the data, the operation converting portions of the data set into the two-dimensional visual model, wherein the at least one hierarchical tree is displayed with the visual model and includes a first dimension hierarchy associated with either a horizontal axis or a vertical axis.

23. The method of claim 22, wherein the step of initiating an operation further comprises the step of initiating a select-slice operation that removes a selected dimension from the visual model, the select-slice operation being initiated by the user by pointing, using a pointing device, to a section of the dimension to be selected and quickly moving the pointing device in a predetermined direction.

24. The method of claim 22, wherein the step of initiating an operation further comprises the step of initiating a repeat-variables operation that causes values corresponding to selected keys of a dimension to be repeated in the visual model for each of the selected keys.

25. The method of claim 22, wherein the step of initiating an operation further comprises the step of initiating a demote/promote operation that changes the dimensionality of the visual model, the demote/promote operation being initiated by the user by pointing to, using a pointing device, and moving a mark on an axis associated with a dimension.

26. A computer system comprising:

a processor;

a display coupled to the processor;

a memory coupled to the processor, the memory including computer instructions and a data set having three or more dimensions, the computer instructions when executed on the processor causing the processor to perform the functions of displaying a two-dimensional visual model on a physical medium representing portions of the data set, the visual model having dimensions of the data set represented as at least one hierarchical tree;

detecting a user's interaction with the data represented in the visual model; and initiating an operation on the data set based on the detected user interaction with the data, the operation converting portions of the data set into the two-dimensional visual model wherein the at least one hierarchical tree is displayed with the visual model and includes a first dimension hierarchy associated with either a horizontal axis or a vertical axis.

27. A method of visualizing a multidimensional data set comprising the steps of:

storing the multidimensional data set using an abstract data model partitioned into dimensions;

converting portions of the data set stored in the abstract data model into a visual model having dimensions of the abstract data model organized as at least one hierarchical tree; and displaying the visual model to a user as a tabular representation on a computer display screen, wherein the data of the data set is displayed graphically, wherein the at least one hierarchical tree is displayed with the visual model and includes a first dimension hierarchy associated with either a horizontal axis or a vertical axis.

* * * * *